Feb. 12, 1946.    A. C. McCANN ET AL    2,394,626
WELDING APPARATUS
Filed Nov. 16, 1943
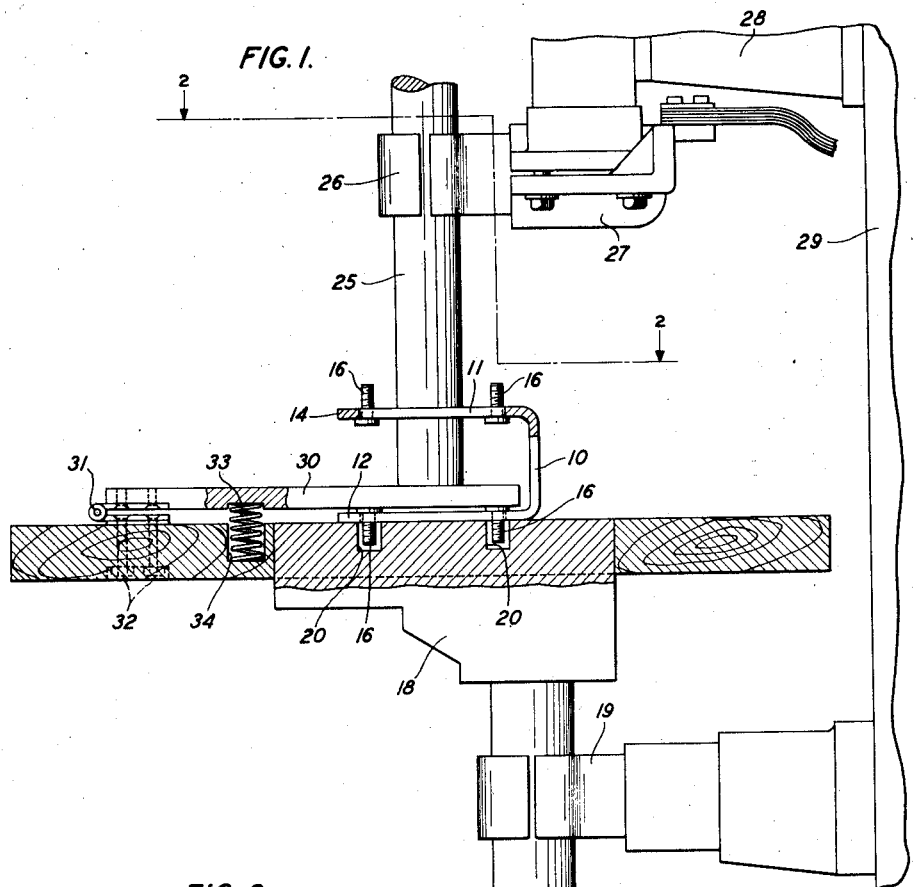
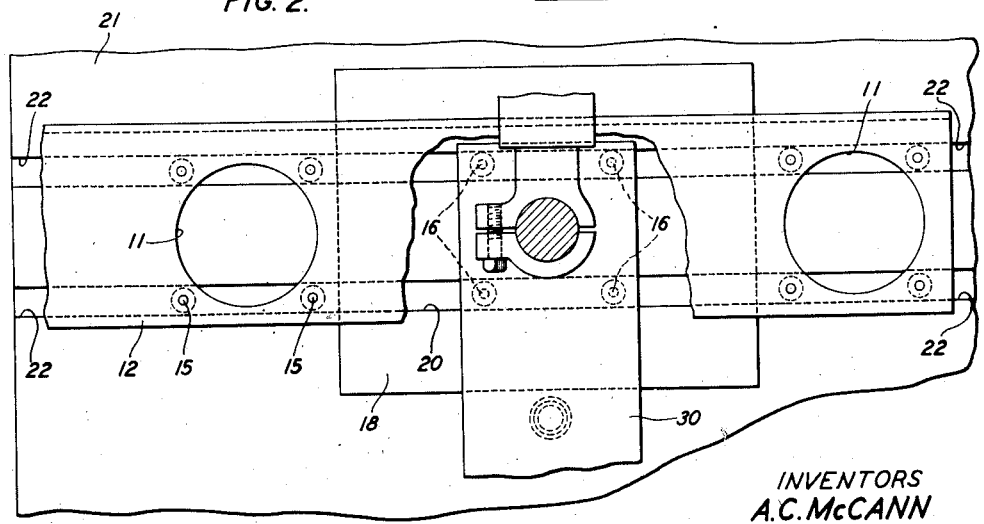
INVENTORS
A.C. McCANN
T.E. WALSH
BY: E.R. Nowlan
ATTORNEY Patented Feb. 12, 1946

2,394,626

UNITED STATES PATENT OFFICE 2,394,626

WELDING APPARATUS

Alexander C. McCann, Kearny, and Thomas E. Walsh, Bayonne, N. J., assignors to Western Electric Company, Incorporated, New York, N. Y., a corporation of New York Application November 16, 1943, Serial No. 510,480

6 Claims. (Cl. 219—4)

This invention relates to welding apparatus, and more particularly to apparatus for spot welding a plurality of articles simultaneously.

An object of the invention is to provide a welding apparatus which is simple in structure, readily actuable, and highly efficient in welding parts.

With this and other objects in view, the invention comprises a welding apparatus for welding articles, such as bolts, in apertures of a channel member, the apparatus including an electrode grooved for the movement of the articles with the member to a welding position, a movable electrode, and an element adapted to be engaged by the movable electrode for engagement with a plurality of the articles for simultaneously welding them to the member.

Other objects and advantages will be apparent from the following detailed description when considered in conjunction with the accompanying drawing, wherein Fig. 1 is a fragmentary side elevational view of the welding apparatus, portions thereof being shown in section, and Fig. 2 is a horizontal sectional view taken substantially along the line 2—2 of Fig. 1.

Referring now to the drawing, attention is first directed to a channel or frame member 10 which is C-shaped in cross-section and is provided with a plurality of pairs of aligned apertures 11 in opposing legs 12 and 14 thereof. Smaller apertures 15 are provided in each of the legs 12 and 14 about the apertures 11, as illustrated in Fig. 2. In these apertures 15, articles such as bolts 16 are to be disposed and, through the aid of the apparatus, they are welded to the channel member 10.

The apparatus includes a stationary welding electrode 18 supported in a conventional manner, as at 19. Grooves 20 are formed in the upper surface of the electrode and extend the full width thereof, for the movement of the bolts 16 therethrough during the advancement of the member 10 from one position to another. A table or support 21 surrounds the electrode 18 and is provided with grooves 22 identical with the grooves 20 and in alignment therewith.

An upper electrode 25, of the contour shown, is supported, as at 26, by a movable head 27, the latter being movable with its support 28 relative to a main frame 29 through the aid of any suitable means (not shown). If desired, a conventional foot-operated treadle mechanism may be employed to lower the electrode and its supporting means relative to the electrode 18, spring means (not shown) being provided, if desired, to return the movable electrode to its normal or upward position. Also, a suitable welding circuit (not shown) may be provided to supply a welding current to the electrodes and the parts to be welded after the movement of the upper electrode into its welding position.

Due to the fact that the heads of the bolts 16 are disposed beyond the reach of the movable electrode 25, it is necessary that additional means be provided to electrically connect the upper electrode with the bolts or articles. This means includes an element 30 hinged, at 31, to the table or support 21, as at 32, and having a contour adapting it to engage a complete set of the bolts or articles 16 about each aperture 11. A spring 33, partially housed in a recess 34, normally urges the element 30 upwardly out of the path of the articles during their movement into welding position.

Considering now the operation of the apparatus, let it be assumed that the articles or bolts 16 for one of the legs, for example, leg 12, of the member 10 are disposed in their respective apertures 15 ready to be welded in place. The member 10 may then be moved on the support or table 21 guided by the bolt 16 in the grooves 20 and 22. The grooves 20 and 22 may be smaller in cross-section, to more nearly conform to the diameters of the bolts if it is desirable to more accurately guide the member 10 and the bolts carried thereby. In the present illustration, viewing Fig. 2, the bolts surrounding the lower aperture 11 at the leading end of the member have been welded in place and the member is now at the second position. Fig. 1 illustrates the apparatus during the welding operation, the movable electrode 25 having been moved downwardly through the aperture 11 in the leg 14, after which it engaged the element 30 and moved the latter into engagement with the four articles or bolts 16 thereunder, applying suitable pressure through the element to the articles to perform the necessary welding operation. It will be apparent that the welding current passes, through the movable electrode 25, the element 30, which is of a suitable conductive material, through the heads of the bolts or articles 16, through the adjacent portions of the member 10, and thus through the electrode 18.

After this welding operation has been completed, the electrode 25 is allowed to move upwardly, freeing the element 30 to be moved upwardly a suitable distance by the spring 33 and conditioning the article 10 for movement to the next welding position, that is, to bring the next set of apertures 11 into registration with the electrodes for the welding of the articles or bolts 16, disposed about the lower aperture thereof, to the member 10. After all of the articles 16 have been welded in place in the leg 12, the member 10 may be reversed in its position and at this time the bolts 16 may be freely disposed in their respective apertures 15, and through a similar process these bolts may be welded in place. In the present illustration, in Fig. 1, the bolts 16 are shown welded in place in the leg 14, but it is apparent that the articles or bolts must be welded in position in one leg prior to the reversing of the position of the member 10 for the welding of the other sets of bolts in place.

Although specific improvements of the invention have been shown and described, it will be understood that they are but illustrative and that various modifications may be made therein without departing from the scope and spirit of this invention as defined by the appended claims.

What is claimed is:

1. A welding apparatus comprising an electrode to support a member and having a groove in one surface thereof to receive articles projecting through the member at spaced positions, a table to assist in supporting the member disposed adjacent the electrode and having a supporting surface lying in the same plane with the surface of the electrode, a movable electrode, and an element supported by the table to be moved into engagement with the articles by the movable electrode for welding the spaced articles simultaneously to the member.

2. A welding apparatus comprising an electrode adapted to support a member and having a groove in one surface thereof to receive articles projecting through the member at spaced positions, a table to assist in supporting the member disposed adjacent the electrode and having a groove disposed in a surface thereof in alignment with the groove of the electrode to guide the articles to the groove of the electrode, a movable electrode, and an element supported by the table to be moved into engagement with the articles by the movable electrode for welding the articles simultaneously to the member.

3. A welding apparatus comprising an electrode adapted to support a member having a plurality of articles carried thereby, a movable electrode, means cooperating with the articles to guide them and the member into welding positions between the electrodes, and an element adapted to be moved into engagement with the articles by the movable electrode for welding the articles simultaneously to the member.

4. A welding apparatus comprising an electrode adapted to support a hollow member having an aperture therein and supporting articles out of alignment with the aperture, an electrode movable through the aperture, and an element mounted to extend into the hollow member to be engaged by the movable electrode and to be moved thereby to form electrical engagement therewith and the articles for welding the articles simultaneously to the member.

5. A welding apparatus comprising an electrode to support a channel member having an aperture in one leg thereof and articles disposed out of alignment with the aperture on the other leg of the member, an electrode movable through the aperture out of alignment with the articles, and an element positioned to be engaged by the movable electrode and to be moved thereby to form electrical engagement therewith and the articles for welding the articles simultaneously to the member.

6. A welding apparatus comprising an electrode to support a channel member having an aperture in one leg thereof and an article disposed out of alignment with the aperture on the other leg of the member, an electrode movable through the aperture out of alignment with the article, and a movably supported element projecting into the channel member between the legs thereof and movable by the movable electrode to form electrical engagement therewith and the article for welding the article to the member.

ALEXANDER C. McCANN.
THOMAS E. WALSH.